(No Model.)
J. MENAHAN.
SPRING BALL FASTENER FOR POCKET BOOKS.
No. 290,906. Patented Dec. 25, 1883.
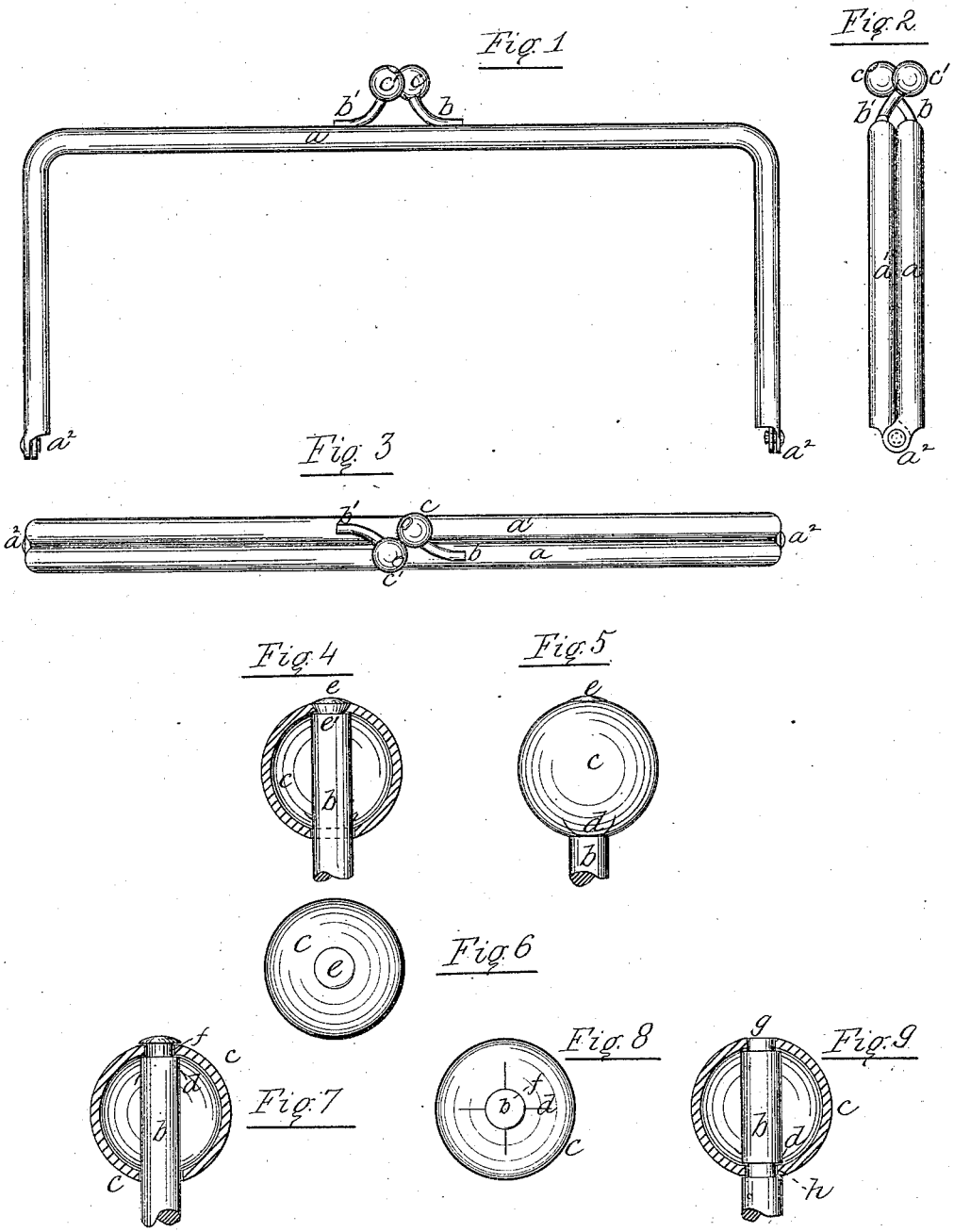

UNITED STATES PATENT OFFICE.

JOHN MENAHAN, OF NEW YORK, N. Y.

SPRING-BALL FASTENER FOR POCKET-BOOKS.

SPECIFICATION forming part of Letters Patent No. 290,906, dated December 25, 1883.

Application filed February 20, 1883. (No model.)

*To all whom it may concern:*

Be it known that I, JOHN MENAHAN, a subject of the Queen of Great Britain, residing at New York, county and State of New York, have invented certain new and useful Improvements in Spring-Ball Fasteners for Pocket-Books, &c., of which the following is a specification.

This invention relates to fastenings for purses, boxes, bags, &c., and embraces certain improvements in spring-knob fastenings adapted to hold together the parts of the articles to which they are attached by springing past or around each other; and the invention consists, first, in fitting the knobs loose on their respective studs, so that as they come together they rotate on their studs, instead of rubbing over one another, thereby imparting a freer action in closing and opening the article; secondly, of a simple and effective manner of securing the knobs to the studs.

Figure 1 of the accompanying drawings represents a side view of the frame of a bag or purse provided with my improved knob-fastening. Fig. 2 is a side view of the same. Fig. 3 is a plan view. Fig. 4 is an enlarged elevation of one of the knobs. Fig. 5 is a sectional view. Fig. 6 is a plan of the same. Fig. 7 is a sectional view of a modification. Fig. 8 is a plan of the same, and Fig. 9 is another modification.

$a$ $a'$ represent the two sides of the frame, hinged together at $a^2$, to the upper central parts of which are rigidly secured the studs $b$ $b'$, in such positions that the knobs or balls $c$ $c'$, fitted to freely rotate thereon, pass by one another when the frame is closed, as shown at Fig. 3.

The balls or knobs used by me are made of sheet metal cut into blanks of proper form, drawn and pressed into shape in the usual manner, leaving a hole in them where the edges of the blank meet, as shown at $d$ in the enlarged views of the drawings. This hole $d$ in Figs. 4, 5, and 6 is sufficiently large to freely pass over the stud $b$, and diametrically opposite to this hole $d$ is punched or drilled another hole, made with taper sides, as shown, somewhat smaller than the hole $d$, so as to fit loosely over a short pin, $e$, formed at the end of the stud $b$. This pin $e$, when the ball is placed on the stud $b$, is set or riveted over, thereby holding the ball on the stud, and the shoulder $e'$, formed by the pin $e$, keeps the ball in position at the end of the stud, the amount of set given the pin being such that the ball $c$ is free to rotate on the stud $b$.

Instead of forming the pin $e$ on the end of the stud $b$, and setting or riveting it over in the taper hole in the upper end of the ball $c$, I propose in some cases to make a groove, $f$, in the upper end of the stud $b$, as shown at Fig. 7. The hole punched or drilled in the ball opposite the hole formed by the edges $d$ of the blank is made so as to fit loosely on the stud $b$, and the hole formed by the meeting edges $d$ is small enough to fit loosely in the groove $f$. The complete closing of the edges of the blank and the final formation of the ball $c$ is in this case performed while the stud $b$ is in the ball, thus avoiding the necessity of riveting over the ends of the stud $b$ to keep the ball in place. In the other modification shown in Fig. 9 both of the holes in the ball are made smaller than the body of the stud $b$, which has a plain pin, $g$, formed on its end to merely act as a guide for the hole drilled or punched in the body of the ball $c$, and a groove, $h$, into which the edges $d$ of the ball are pressed during the final formation of the ball in the manner applied in securing the ball shown at Figs. 7 and 8.

The advantage of having the knobs or balls of this class of fastenings free to rotate on their studs is that while they hold the frame closed as securely as when they are rigid, their contact-surfaces roll on one another, instead of rubbing, when the frame is closed or opened. Because of this, they have a much freer action, and are therefore easier of operation than the rigid balls, and there is practically no wear on the surfaces. As the balls are generally made of plated metal, this latter is very important.

It is obvious that the method of attaching balls to their studs shown and described may be applied to other purposes; but I do not claim, broadly, such method, as it will form the subject of another application for Letters Patent.

What I claim, and desire to secure by Letters Patent, is—

1. In a fastening for bags, purses, boxes, &c., the combination, with the hinged parts thereof, of fixed studs and balls adapted to rotate thereon, substantially as and for the purpose hereinbefore set forth.

2. In combination, the hinged frame $a\ a'$, having studs $b\ b'$, provided with shouldered bearings at their ends, and balls $c\ c'$, having diametrically-opposite holes, one of which fits loosely on the body of the studs and the other one on the shouldered bearings by which the balls are retained on the studs, substantially as and for the purpose set forth.

In witness whereof I have hereunto set my hand, at New York, county and State of New York, this 16th day of February, 1883.

JOHN MENAHAN.

Witnesses:
H. D. WILLIAMS,
E. G. BAKER.